March 29, 1949. P. H. GOLDSMITH 2,465,445
FLOW SPREADER

Filed Feb. 3, 1945 5 Sheets-Sheet 1

Inventor
PHILIP H. GOLDSMITH

By Cushman Darby & Cushman
Attorneys

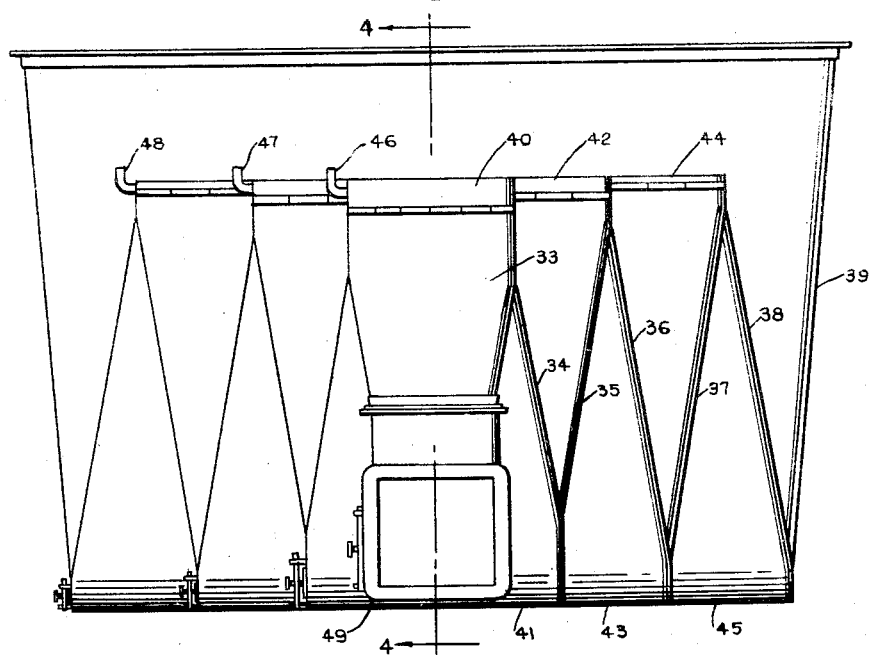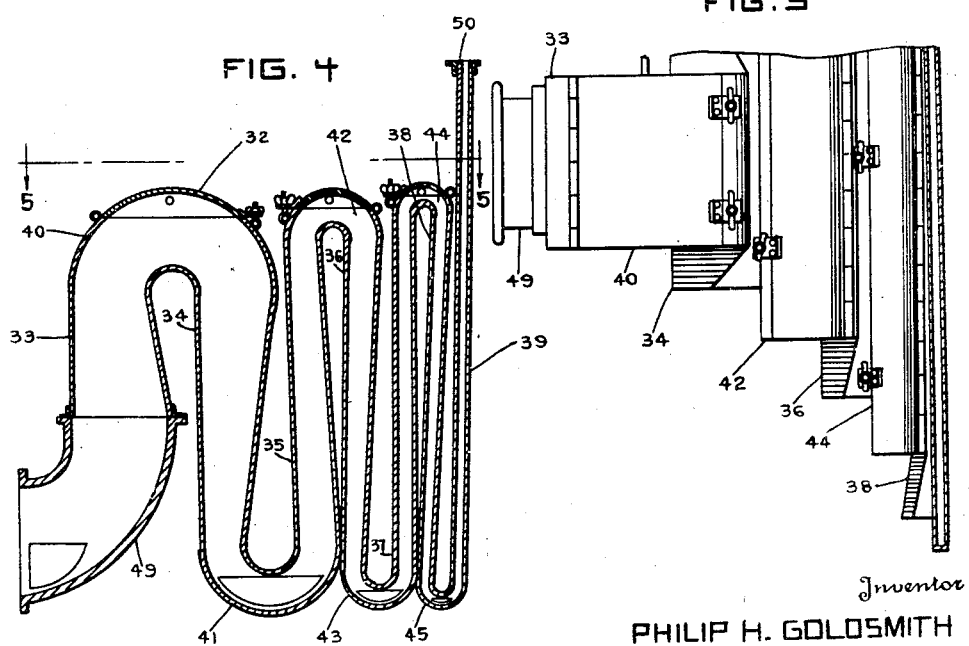

March 29, 1949.　　　P. H. GOLDSMITH　　　2,465,445
FLOW SPREADER

Filed Feb. 3, 1945　　　　　　　　　5 Sheets-Sheet 3

Inventor
PHILIP H. GOLDSMITH

March 29, 1949.　　P. H. GOLDSMITH　　2,465,445
FLOW SPREADER

Filed Feb. 3, 1945　　5 Sheets-Sheet 5

Inventor
PHILIP H. GOLDSMITH

Attorneys

Patented Mar. 29, 1949

2,465,445

UNITED STATES PATENT OFFICE 2,465,445

FLOW SPREADER

Philip H. Goldsmith, Wilmington, Del.

Application February 3, 1945, Serial No. 575,988

19 Claims. (Cl. 92—43)

This invention relates to flow spreader conduits for paper making machines and has as a main object to provide a spreader which will receive the flow from the usual stock supply pipe and spread it smoothly at uniform velocity across the width of the machine to be supplied.

In its simplest form the new spreader may comprise a single pass which continuously increases symmetrically in width and decreases in depth from its input to its output end, the cross sectional area of the spreader at its output end being no greater than the cross sectional area at its input end. In order to increase the squeezing action, whereby the flow is more positively spread throughout the width of the spreader, the cross sectional area of the spreader conduit may continuously decrease somewhat from its input to its output with consequently increased flow velocity. In other words, the ratio of the cross-sectional area of the inlet end of the spreader may be to the cross-sectional area of its outlet end as one to one, or as one to one minus.

The possible length of a single pass spreader is limited by the space available, and this space is small in the case, for example, of a multi-unit cylinder machine where the spreaders are arranged horizontally beneath their associated vats. In such case, the spreader must widen abruptly. Better results are secured where there is a more gradual widening throughout a greater spreading length and in accordance with the present invention this greater length is secured in a small space by providing a multiple pass spreader of serpentine or undulatory form with up-passes and down-passes arranged closely together. In this case, each of the passes may be of substantially constant cross sectional area throughout, or the cross sectional area of each may be continuously decreased somewhat throughout, the turn-arounds at the upper and lower ends of the passes being conveniently of constant width and depth. Even with this arrangement it may be difficult to hold outflow velocity suitably low without the use of an oversize stock delivery pipe. This latter difficulty is completely avoided, in accordance with the invention, by the use of turn-arounds which enlarge in cross sectional area in the direction of flow. Using such turn-arounds, each pass can easily have a requisite squeeze action for its spread and the output velocity can be any desired figure.

In order that the invention may be fully understood, I have shown in the accompanying drawings embodiments of the forms above discussed. In the drawings—

Figure 3 is an end elevation of a multiple pass spreader whose passes continuously increase in width and decrease in depth from the inlet to the outlet end of the spreader.

Figure 4 is a section substantially on line 4—4 of Figure 3.

Figure 5 is a partial plan view of the spreader of Figures 3 and 4.

Figure 1:
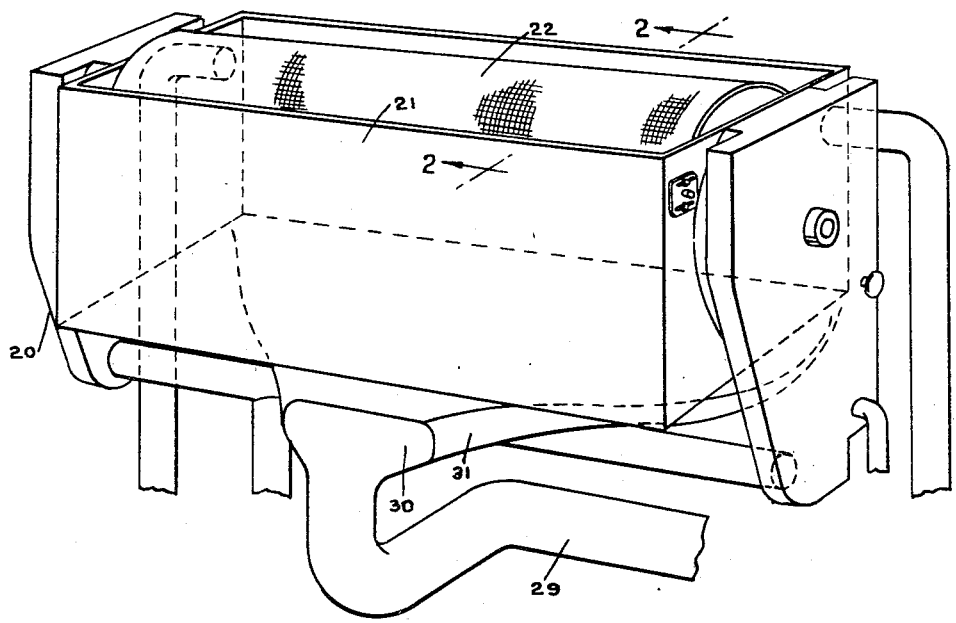
Figure 1 is a perspective view of a cylinder machine equipped with a single pass spreader in accordance with the invention.
Figure 2:
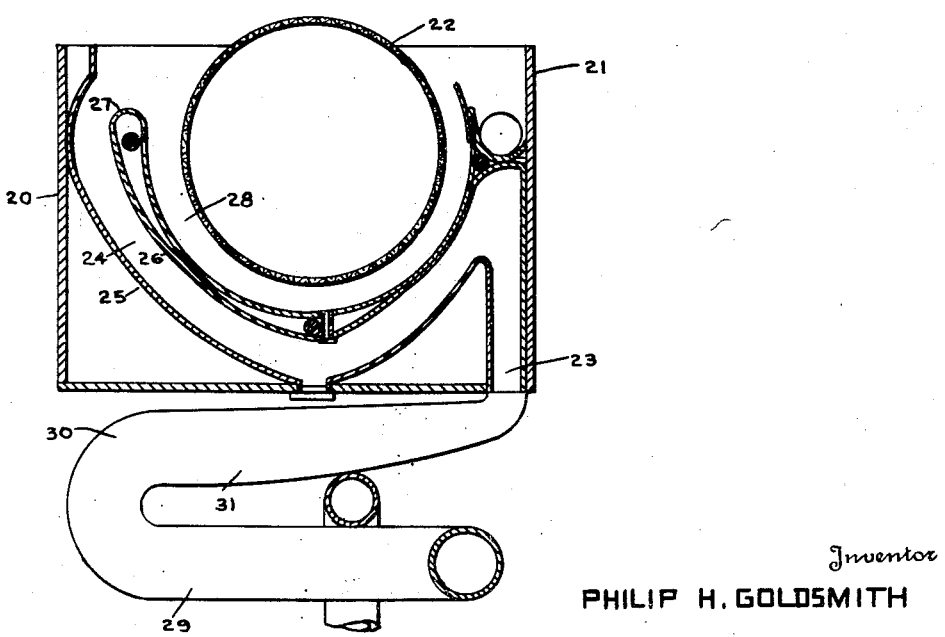
Figure 2 is a section substantially on line 2—2 of Figure 1.

Referring first to Figures 1 and 2, the cylinder machine 20 includes a vat 21 and a cylinder 22, the vat having a bottom inlet opening 23 which extends the full width of the machine. The inlet opening communicates with a passage 24 between a fixed outer circle 25 and an adjustable inner circle 26, the stock flowing over the top 27 of the inner circle to a passage 28 between the latter and the mold. This arrangement and other vat details are disclosed in my Patents Nos. 2,354,007, of July 18, 1944, and 2,363,786, of November 28, 1944, these patents deriving from an original application filed September 27, 1938, Serial No. 231 854, now Patent Number 2,412,771, issued December 17, 1946, of which the present application is a continuation-in-part.

In Figures 1 and 2, reference numeral 29 designates a stock supply pipe which has an expanded adapter portion 30 in connection with a spreader 31 whose output end has a width the same as the width of the vat opening 23 and is in delivering relation thereto. The spreader 31 increases continuously in width and decreases continuously in depth to its output end and may be considered to include the adapter portion 30. The cross sectional area of the spreader at its output end is no greater than the cross sectional area at its input end. In order to enhance the squeezing action, the spreader may continuously decrease in cross sectional area from its input to its output end and this is particularly desirable where the angle of spread is wide, as in the present instance. The cross sectional area of the spreader cannot increase in the direction of flow since in that case the essential squeezing action would be lost, resulting in the loss of constant output velocity across the machine so that the uneven output would result in eddies eventually adversely affecting the formation of the web on the mold.

The embodiment of the invention shown in Figures 3 to 5 derives from my co-pending application Serial No. 323,186, filed March 9, 1940, now abandoned, the present application being also a continuation-in-part of that case. The spreader, designated as a whole by the reference numeral 32, comprises a plurality of passes 33 to 39 which are arranged closely together in generally vertical disposition and have their ends connected by turn-around portions 40 to 45. As here shown, the bends at the turn-arounds are actually somewhat greater than 180°. Each of the passes continuously increases in width and decreases in depth throughout its length, the turn-arounds each being of constant width and cross sectional area as here shown. Each of the top turn-arounds includes a hinged cover portion which may be opened for wash-out purposes and connected into the top turn-arounds are air vent pipes 46, 47 and 48. Each of the bottom turn-arounds is provided with a lateral clean-out door. Reference numeral 49 designates an inlet fitting in the form of an elbow of rectangular internal section connectible through a suitable adapter with the usual stock supply pipe. The up-pass 33 starts at elbow 49 with the same rectangular internal section as the output end of the latter, this rectangle continuously increasing in width and decreasing in depth to the turn-around 40. The down-pass 34 has an input opening of the same dimensions as the output opening of the up-pass 33, these dimensions continuously increasing as to width and decreasing as to depth down to the bottom turn-around 41 which carries the bottom dimensions of pass 34 over to the bottom of the up-pass 35, and so on. The final up-pass 39 has a top opening 50 whose width is substantially that of the machine to be supplied.

The illustrated undulatory arrangement of the passes not only enables me to secure a considerable length of flow, with gradual widening, in a small space, but I have found that the turn-arounds themselves are of great value in smoothing out the flow. Using the gradual squeezing action possible with the increased length of the spreader, plus the auxiliary smoothing action of the turn-arounds, I am enabled to produce an absolutely smooth and even output at the outlet 50. The illustrated unit is readily disposable beneath an associated vat, in the case of a cylinder machine, entirely within the vat projection, and this, of course, is a feature of prime importance in the case of a multi-unit cylinder installation, each unit, of course, having its own spreader.

Figure 6:
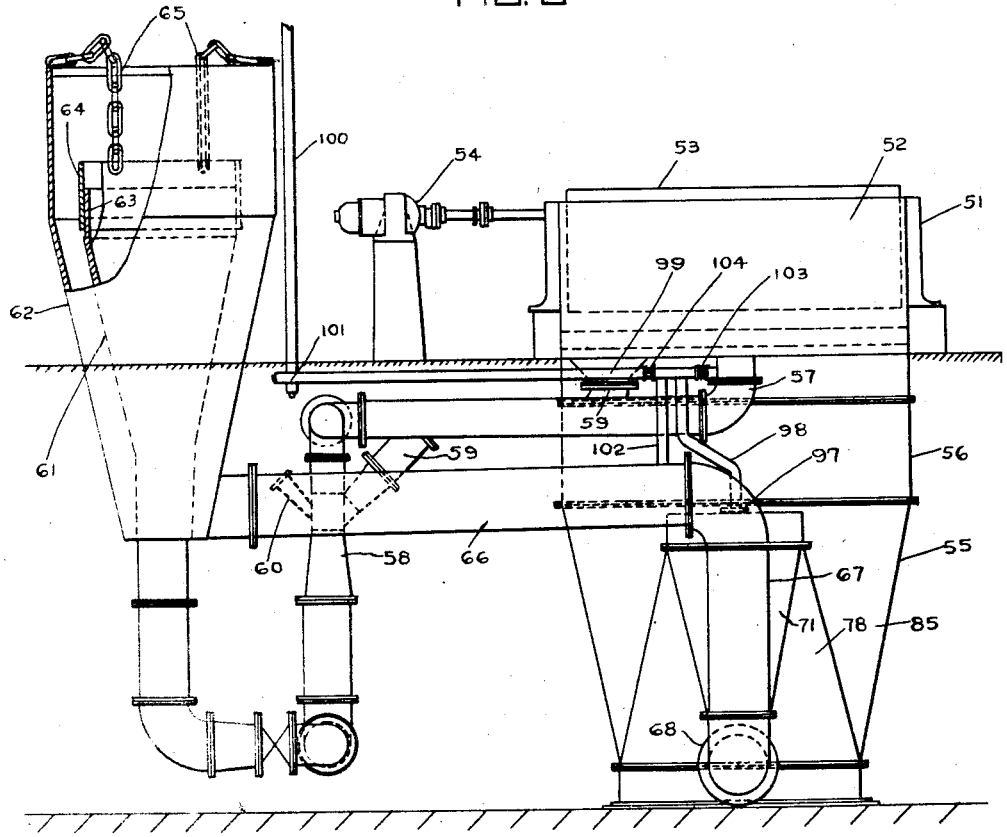
Figure 6 is an elevation of a cylinder machine installation with stock feeding means including a spreader having multiple passes with turn-arounds which increase in cross sectional area in the direction of flow.

In Figure 6, reference numeral 51 designates a cylinder machine including a vat 52 and a cylinder 53, the latter being driven by a motor 54. Reference numeral 55 designates generally a spreader in accordance with the invention disposed below the machine 51 and in connection with the vat inlet opening by means of a conduit section 56. Reference numeral 57 designates a white water conduit in connection with the vat and leading to a mixer 58 to which is also led the circulating stock outlet 59 from the vat and an input pipe 60 for new stock. The mixture is forced by a pump, not shown, into the lower end of a head box comprising an upwardly opened conical tank 61 concentrically disposed within an upwardly open conical tank 62. Tank 61 has a cylindrical top portion 63 slidably embraced by a ring dam 64 maintainable in desired vertical adjustment by supporting chains 65. The mixture pumped into the tank 61 flows evenly over the dam 64 with air removal, into the annular space between the two tanks. The stock flows from the bottom of tank 62 through a pipe 66, which is inclined somewhat upwardly in the direction of flow, to a downpipe 67 in connection with an elbow 68 which changes from circularity at its input end to rectangularity at its output end. By way of illustration, it will be assumed that the feed conduit 66, 67 is of 24 inch rated capacity and that the machine 51 has a vat width of 140 inches.

The inlet opening 69 of fitting 68 has a diameter of 23.5/8" and the rectangular outlet 70 has a width of 23.5/8" and a depth of 18½". This gives an input area of 438 sq. in. and a substantially equal output area i. e., 437 sq. in.

The first pass 71 of the spreader is disposed vertically on fitting 68 and has an inlet opening of the same dimensions as the opening 70. Pass 71 is 5' 7" in height and has a rectangular horizontal outlet opening which is 54" in width and 7" in depth and is symmetrically disposed with respect to the inlet opening, i. e., the side walls of the pass diverge at equal angles from the vertical. The cross sectional area of the pass is reduced at the rate of 2½% per running foot or for a total of about 14%. The area of the outlet opening is 378 sq. in. which is a reduction of 59 sq. in.

If two rectangles of different size in parallel planes are connected by straight lines joining their corners, then the rectangles of intermediate parallel planes will not bear a relation to the area of the end rectangles proportional to their distances from them. Therefore, if the pass 71 were defined by four straight plates, the area between the inlet and outlet would actually be considerably greater through most of the length of the pass than the area at the inlet. There would not be a constant rate of change in area and squeezing action for every foot of the spreading length. The pass 71, with the input and output dimensions above given, would have an intermediate area of 497 sq. in., an error of about 21%. In order to avoid this discrepancy, and this should be done for the best results, the side plates 72 and 73 and the back plate 74 of pass 71 may be flat, the front plate 75 being shaped as particularly shown in Figure 7 so that the cross sectional area of the passage is reduced at a constant rate. The front plate 75 is somewhat inwardly bowed giving a depth at one foot intervals, moving up, of 14.7", 12", 10.1", 8.7", and 7.5".

Reference numeral 76 designates a turn-around having an inverted U-shaped passage 77. One leg of the turn-around is secured to the upper end of pass 71 and has an opening of the same dimensions as the outlet opening of the latter. As here shown, the passage 77 has a constant width but enlarges in depth to a rectangular outlet opening whose depth is 12.31" with an area of 665 sq. in. The turn-around has a mean flow length of 2' 1⅛". The output leg of the turn-around 76 is secured to the top of a pass 78 having a passage defined by straight side plates 79 and 80 and a straight back plate 81, the front plate being bowed inwardly to obtain the constant effect above mentioned. Pass 78 has an upper or inlet opening of the same dimensions as the outlet opening of the turn-around and has a bottom rectangular opening which is 93" in width and 5.75" in depth, providing an outlet opening of 535 sq. in. This is a reduction of 130 sq. in., or about 19%, from the inlet. This pass is 7' 7" in length and, moving downwardly at one foot intervals, its depth is 10.9", 9.8", 8.85", 8", 7.25", 6.62" and 6.05".

Reference numeral 83 designates a bottom turn-around having a U-shaped passage 84 with an inlet communicating with and having the same dimensions as the outlet of pass 78. Turn-around 83 is of constant width but increases in depth to an outlet opening whose depth is 10.25" with an area of 953 sq. in. The mean flow length is 1' 10¼".

Reference numeral 85 designates a pass having an inlet opening of the same dimensions as the outlet end of turn-around 83 and in communication therewith. The pass is defined by straight side plates 86 and 87 and a straight back plate 88, the front plate 89 being bowed inwardly and the arrangement being such as to provide an outlet opening having a width of 140" and a depth of 5¼", giving an area of 735 sq. in. The reduction in the area is 217 sq. in. or about 22.7%. The pass 85 is 9' 1" high and, moving up at one foot intervals, the shape of the front plate 89 is such that the depths are as follows: 9.45", 8.75", 8.1", 7.5", 7", 6.5", 6.1", 5.6" and 5.28".

Section 56, Figure 6, merely serves to connect the top of pass 85 with the feed opening of vat 52 and it has the same dimensions throughout as the outlet opening of pass 85.

It has been assumed in the above description that the vat width is 140", but the vat width could be anywhere from that figure down to 93". In the latter case, keeping the same depth at the outlet end of the final pass, the outlet area would be 488 sq. in., a decrease in area of 465 sq. in. With a 140" spreader and a velocity of 5.9 f. p. s. at fitting 68 the velocity will rise to 6.8 at the top of the first pass, drop to 3.9 in the top turn-around, rise to 4.8 in the second or down-pass, drop to 2.7 in the bottom turn-around, and rise in the final pass to 3.5 at 8,000 g. p. m. In the 93" spreader, with an input velocity of 3.9 f. p. s., the velocity will rise to 4.5 in the first pass, drop to 2.6 in the top turn-around, rise to 3.2 in the down-pass, drop to 1.8 in the bottom turn-around, and rise to 3.5 at the top of the final up-pass at an output of 5,300 g. p. m.

The over-all length of the illustrated spreader, with fitting 68, is less than 6 feet so that it is readily disposable beneath an associated vat which will have, for example, a length in the neighborhood of 9 feet.

Using a rated 20" inlet fitting, the final spread can be from 79" to 120" in width with a depth of 4.25"; with a 30" diameter inlet fitting the outlet opening can have a width of from 119" to 180" with a depth of 6½"; and with a 38" diameter inlet fitting the outlet opening can be from 157" to 240" in width with a depth of 7⅞". Thus with the four sizes of inlets i. e., 20", 24", 30", and 38", the spread can range anywhere from 79" to 240".

Figure 8:
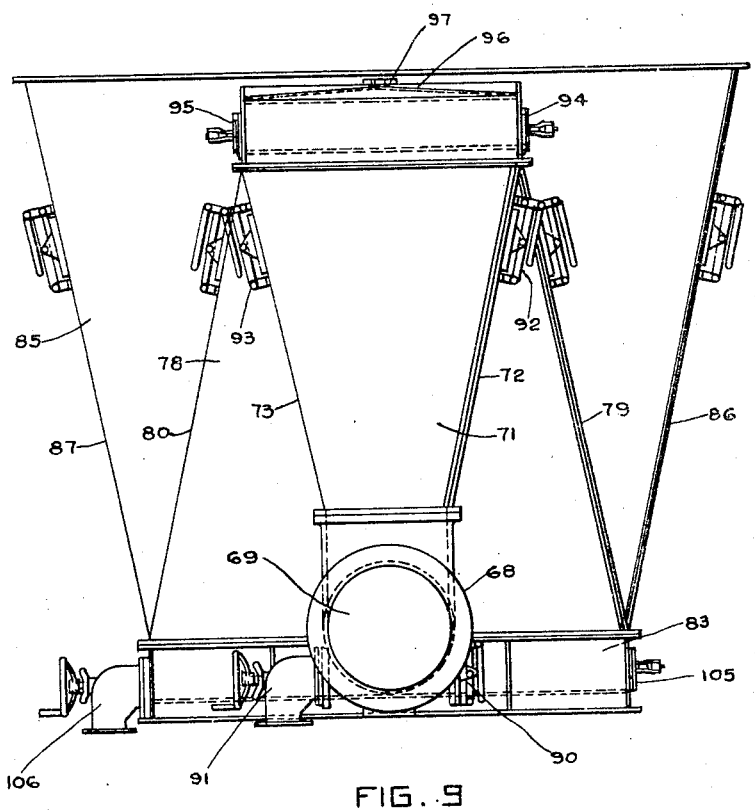
Figure 8 is an enlarged end elevation of the spreader of Figure 6.

Fitting 68 is provided with a bottom clean-out door 90 at one side and with a dump valve 91 at the other, Figure 8. The up-pass 71 has wash-out doors 92 and 93 near its upper end and the turn-around 76 has wash-out doors 94 and 95. The top wall of the turn-around is provided with an internal transverse recess 96 which slopes upwardly from both sides to an outlet nipple 97. A pipe 98 connects nipple 97 with a horizontal pipe 99 extending from the white water pipe 57 to a stand pipe 100 which extends upwardly to a height beyond any head which may exist in the feed system. Pipe 99 is connected to pipe 100 through a cross-shaped four-way fitting 101 whose free ends are fitted with removable plugs for wash-out purposes. A pipe 102 connects the highest part of the inclined stock feed pipe 66 with pipe 99 adjacent pipe 98 and valves 103 and 104 are provided in pipe 99 outwardly of pipes 98 and 102. By closing valve 103 and opening valve 104 the stock supply pipe and the top turn-around 76 will vent to atmosphere through stand pipe 100, thus preventing the formation of air locks. Or by closing valve 104 and opening valve 103 there will be by-passing and air venting to the feed system in advance of the air release means constituted by the up-flow head box. The venting system must always be on the rise or at least must not dip below horizontal since otherwise an air lock will form in it. The same venting connections can be used with the spreader of Figures 3 to 5.

In Figure 8 it will be seen that the down-pass 78 and the final up-pass 85 are provided near their upper ends with wash-out doors and that the bottom turn-around 83 is provided at one side with a wash-out door 105 and at the other with a dump valve 106.

Figure 9:
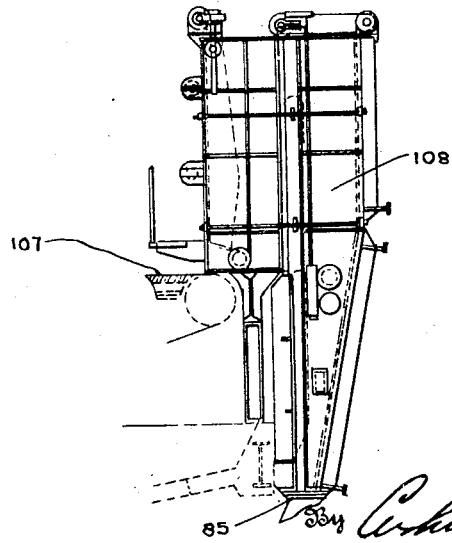
Figure 9 is a partial elevation showing the manner of association of a spreader in accordance with the invention with a Fourdrinier machine.

The new spreader is just as applicable to Fourdrinier machines as to cylinder machines. In Figure 9 reference numeral 107 designates the wire of a Fourdrinier machine and reference numeral 108 represents a slice box of conventional design shown as being in connection with the upper end of the final up-pass 85, the outlet end of the up-pass having a width substantially the width of the slice box.

Figure 7:
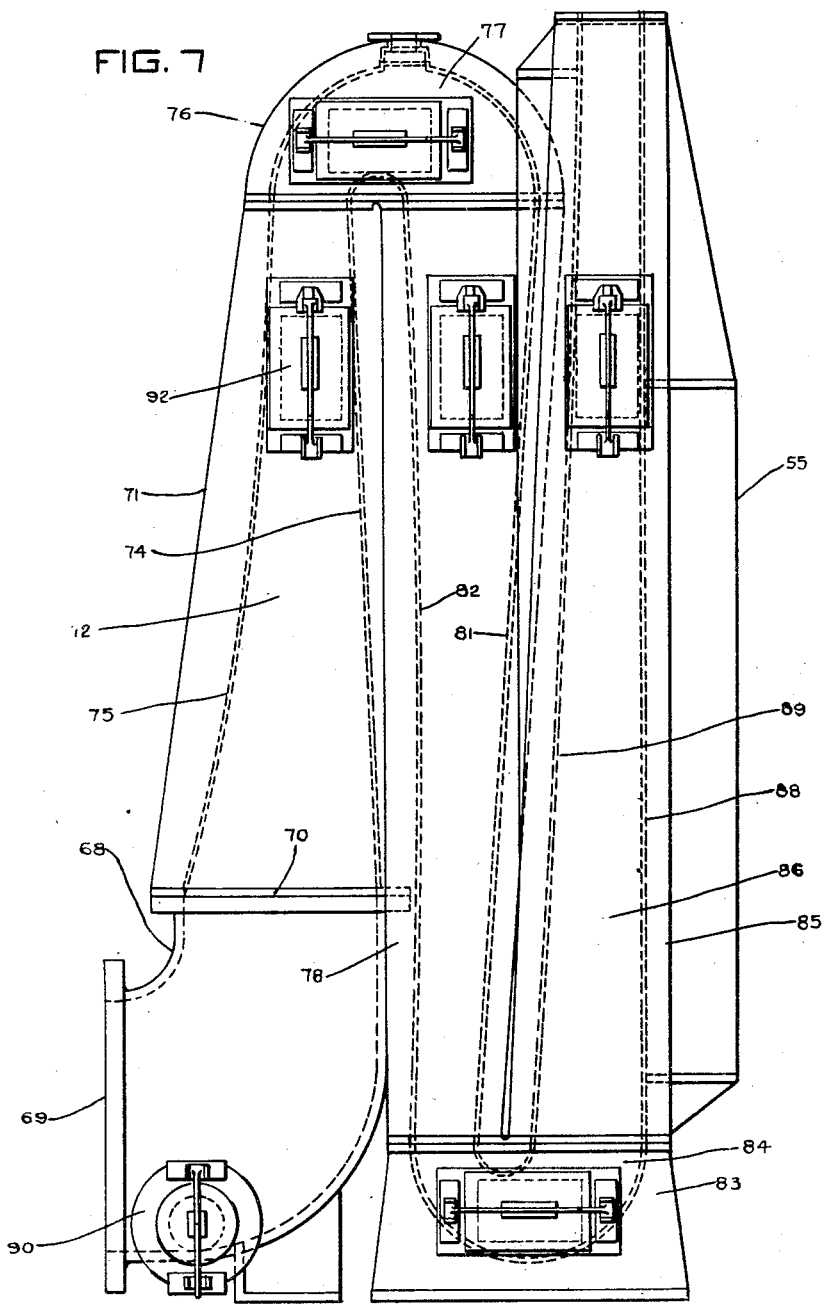
Figure 7 is an enlarged side elevation of the spreader of Figure 6.

In Figures 6 to 8 three spreading passes are shown but any appropriate number from two on up may be used. Effective spread of the flow from a single stock pipe is provided. The generally vertical passes can be very readily washed out using the wash-out doors at top and bottom, as shown.

It will be understood that the invention is not limited to the disclosed form and arrangement of parts but is susceptible of variation in these respects within the terms of the claims which follow.

I claim:

1. A flow spreader conduit for a paper making machine, said conduit including a section which continuously increases in width and decreases in depth in the direction of flow and has an area at its input end greater than at its output end, said section being shaped so that its cross-sectional area reduces at a substantially constant rate from its input to its output end.

2. A flow spreader conduit for a paper making machine, said conduit having an inlet opening adapted to be connected to a stock supply conduit and having a narrow elongated outlet opening whose width is substantially that of the machine, said conduit continuously increasing in width and continuously decreasing in depth in the direction of flow and providing an unobstructed passage for spreading the stock, the cross-sectional area of said outlet opening being no greater than the cross-sectional area of said inlet opening, whereby the stock from the supply conduit is spread across the width of the machine with uniform velocity distribution.

3. A flow spreader conduit for a paper making machine, said conduit having an inlet opening adapted to be connected to a stock supply conduit and having a narrow elongated outlet opening whose width is substantially that of the machine, said conduit continuously increasing in width and continuously decreasing in depth in the direction of flow and providing an unobstructed passage for spreading the stock, the cross-sectional area of said outlet opening being less than the cross-sectional area of said inlet opening so that the stock flowing in said conduit is spread to the width of said outlet opening at continuously increasing velocity with uniform velocity distribution throughout the width of said outlet opening.

4. A flow spreader conduit for a paper making machine, said conduit having an inlet opening adapted for connection to a stock supply pipe and having an outlet opening whose width is substantially that of the machine, said conduit being of undulatory form and comprising at least two generally upright passes and a turn-around connecting adjacent ends of said passes, each of said passes progressively increasing in width and decreasing in depth in the direction of flow the outlet opening of each pass being no greater than that of its inlet opening.

5. A flow spreader conduit according to claim 4 wherein the width of the conduit continuously increases and the depth thereof continuously decreases in the direction of flow throughout the passes except at the turn-around which has a substantially constant cross-sectional area.

6. A flow spreader conduit according to claim 4 wherein the turn-around enlarges in depth in the direction of flow and the input end of the downstream pass has a larger area than the output end of the upstream pass the area of the output end of each pass being less than the area of its input end.

7. A flow spreader conduit for a paper making machine, said conduit having an inlet opening adapted for connection to a stock supply pipe and having an outlet opening whose width is substantially that of the machine, said conduit being of undulatory form and comprising at least one up-pass and at least one down-pass and a turn-around connecting the upper ends of said passes, each of said passes progressively increasing in width and progressively decreasing in depth in the direction of flow and the area of the outlet opening of its pass being no greater than that of its inlet opening.

8. A flow spreader conduit according to claim 7 wherein the width of the conduit continuously increases and the depth thereof continuously decreases in the direction of flow throughout the passes except at the turn-around which has a substantially constant cross-sectional area.

9. A flow spreader conduit according to claim 7 wherein the turn-around enlarges in depth in the direction of flow and the upper end of the down-pass has a greater area than the upper end of the up-pass.

10. A flow spreader conduit comprising a first section adapted for connection to a stock supply pipe, said section increasing in width and decreasing in depth from its input to its output end and the area of its output end being no greater than that of its input end, a second section connected to the first and having an output end of greater area than the output end of the first section, and a third section in connection with the output end of the second section and having an input end of greater area than that of the output end of the first section, said third section increasing in width and decreasing in depth from its input to its output end and the area of its output end being no greater than the area of its input end.

11. A flow spreader conduit according to claim 10 wherein the first and third sections are shaped so that the area of each is reduced at a substantially constant rate from input to output ends.

12. A flow spreader conduit according to claim 10 wherein the first and third sections are disposed generally upright and the second section is constituted as a turn-around.

13. A flow spreader conduit for a paper making machine, said conduit having an inlet opening adapted for connection to a stock supply pipe and having an outlet opening whose width is substantially that of the machine, said conduit being of undulatory form and comprising first and second up-passes, a down-pass between the up-passes, a first turn-around connecting the upper ends of the first up-pass and the down-pass, and a second turn-around connecting the lower ends of the down-pass and the second up-pass, each of said passes progressively increasing in width and progressively decreasing in depth in the direction of flow and the outlet of said second up-pass constituting the aforesaid conduit outlet opening.

14. A flow spreader conduit according to claim 13 wherein the width of the conduit continuously increases and the depth thereof continuously decreases in the direction of flow throughout the passes except at the turn-arounds which have a substantially constant cross-sectional area.

15. A flow spreader conduit according to claim 13 wherein the turn-arounds enlarge in area in the direction of flow, the upper end of the down-pass has a greater area than the upper end of the first up-pass, the lower end of the second up-pass has a greater area than the lower end of the down-pass, and the area of the output end of each pass is no greater than the area of its input end.

16. A flow spreader conduit for a paper making machine, said conduit having an inlet opening adapted for connection to a stock supply pipe and having an outlet opening whose width is substantially that of the machine, said conduit being of undulatory form and including at least two spreading passes and a turn-around connecting said passes, each of said passes progressively increasing in width and decreasing in depth in the direction of flow and the area of the inlet opening of each pass being no greater than that of its outlet opening.

17. A flow spreader conduit for a paper making machine, said conduit being internally unobstructed and including a section having an inlet opening and an outlet opening, said inlet opening having substantially the same flow capacity under a predetermined pressure as that of a stock supply pipe under substantially the same pressure, with which the inlet opening is to be connected and the flow capacity of the outlet opening being no greater than that of the inlet opening under the same pressure conditions, said section continuously decreasing in depth and increasing in width from said inlet opening to said outlet opening.

18. A flow spreader conduit for a paper making machine, said conduit having an inlet opening adapted for connection to a stock supply pipe, said conduit including a first length which continuously increases in width and decreases in depth away from said inlet opening and has an outlet opening of no greater area than that of said inlet opening, a second length in communication with the outlet opening of said first length and having a substantially constant cross-sectional area which is substantially the same as that of said outlet opening, and a third length having an inlet opening in communication with the outlet opening of said second length, said third length continuously increasing in width and decreasing in depth away from its inlet opening and having an outlet opening of no greater area than that of its inlet opening.

19. A flow spreader according to claim 18 wherein the first and third lengths are upright and the second length is constituted as a turn-around.

PHILIP H. GOLDSMITH.

REFERENCES CITED

The following references are of record in the file of this patent:

UNITED STATES PATENTS

| Number | Name | Date |
|---|---|---|
| 1,774,363 | Fletcher | Aug. 26, 1930 |
| 1,846,406 | Sweeney | Feb. 23, 1932 |
| 1,866,607 | Wood | July 12, 1932 |
| 1,964,291 | Kutter | June 26, 1934 |
| 2,005,839 | Edge | June 25, 1935 |
| 2,060,808 | Kellett et al. | Nov. 17, 1936 |
| 2,116,763 | Kutter | May 10, 1938 |
| 2,205,693 | Milne | June 25, 1940 |

FOREIGN PATENTS

| Number | Country | Date |
|---|---|---|
| 512,808 | Great Britain | Sept. 26, 1939 |
| 617,427 | Germany | Aug. 19, 1935 |

OTHER REFERENCES

The Post-War Fourdrinier, by George H. Spencer, reprinted from Paper Mill News, December 26, 1942.

The Stream Flow Vat System, by Philip H. Goldsmith, reprinted from Paper Trade Journal, March 28, 1940.

Development of the Stream Flow Vat System, by Philip H. Goldsmith, reprinted from Paper Mill News, June 21, 1941.

The Flow Spreader by Samuel M. Bratten and Frank M. Sanger, reprinted from Paper Trade Journal, October 1, 1942.